Oct. 8, 1946. J. R. STARNES Re 22,801
INTERCHANGEABLE LETTER SIGN
Original Filed April 29, 1940
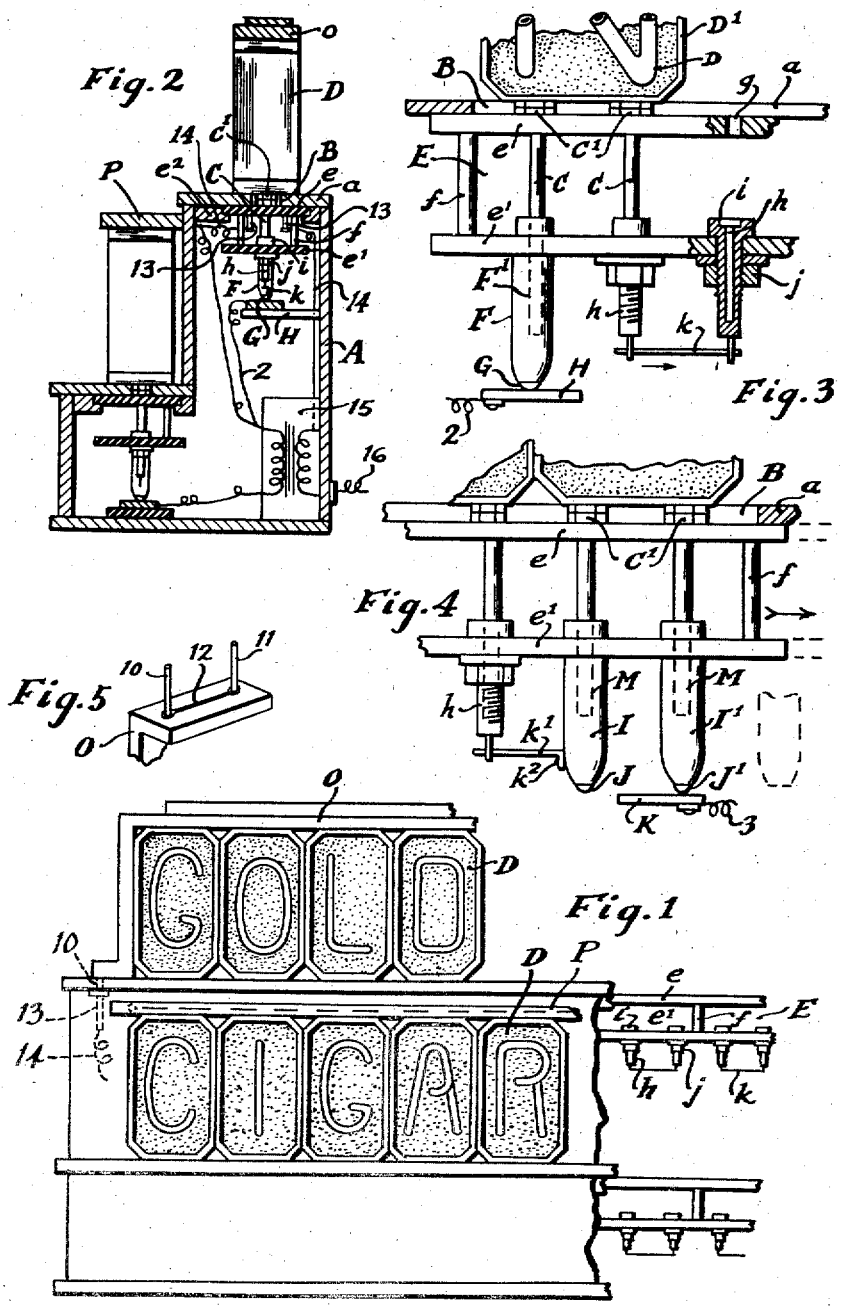
INVENTOR
J. R. STARNES
By: Fetherstonhaugh & C.
ATT'YS Reissued Oct. 8, 1946

Re. 22,801

UNITED STATES PATENT OFFICE 22,801

INTERCHANGEABLE LETTER SIGN

James R. Starnes, Toronto, Ontario, Canada, assignor, by mesne assignments, to Nusign Electric Limited Original No. 2,295,188, dated September 8, 1942, Serial No. 332,412, April 29, 1940. Application for reissue September 7, 1944, Serial No. 553,100

2 Claims. (Cl. 40—130)

This invention relates to a portable sign adapted for window display, and of an illuminating character, embodying detachable and interchangeable lamps in the form of letters, figures and symbols, the lamps employing a luminescent gas, such as neon.

A novel feature of the invention resides in the manner in which the lamps are mounted in the case, and adapted to be readjusted and interchanged for spelling out names and words, of various numbered letters, and for a general permutation of the character of display.

An object of the invention is to provide a mounting for the letters adapted for lateral adjustment, to facilitate the letters being adjusted at various intervals, as well as permutably to spell out words of various lengths, where the number of letters may be changed from odd to even, and vice versa, to adapt the words being centered in the case.

A further object of the invention as an illuminating display sign, is the means for readily interchanging the letters or characters, where an illuminable gaseous mixture is used, such gaseous mixture being of a character to produce a glow in various colours.

A further object of the invention is to provide a suitable case for mounting the letters and characters, in which may be housed suitable transformers to produce the transmission of the necessary high tension current required in connection with lamps employing a luminescent gas as the illuminating element of the lamp.

A further object of the invention is to provide a detachable letter, figure or symbol in the form of an illuminating tube, imbedded in a composition leaving only an outline portion of the tube exposed.

In the drawing illustrating my invention,

Figure 1 is a front elevational view of a portion of the sign,

Figure 2 is a transverse elevational view through the case,

Figure 3 is a detail elevational view of one end of the mounting for the letters, Figure 4 is a detail elevational view of the opposite end of the mounting for the letters, and Figure 5 is a detail view showing the underside of one of the circuit connections.

Like letters refer to like parts throughout the several views.

A designates a cabinet, made in any suitable ornamental design, adapted to detachably mount thereon a plurality of letters, figures or symbols, formed by tubes containing luminescent gas, with an interior capacity for housing a laterally adjustable mounting for the lamps, and any necessary transformer and switch mechanism that may be required in fitting up the wiring circuits and connection.

The cabinet may be designed to provide for mounting more than one row of interchangeable letters, in the drawing I have shown two.

Formed through the top *a* of the cabinet A is an elongated opening B, for inserting the contacting prongs C—C of the lamps D, hexagonal nuts or the like $C^1$ being carried on the prongs and abutting the base of the lamps D acting as suitable spacers.

The lamps D are formed of glass tubes shaped to represent letters and figures, filled with a luminescent gas, such as neon, and various other mixtures to produce a glow in various colours.

The glass tubes representing letters are partially imbedded in a plastic composition leaving only an outline portion of the tube showing above the plastic face, as shown particularly in Figures 1 and 3. This provides a unitary structure having the electrodes disposed rearwardly of the face of the composition which is preferably incased in a box-like frame $D^1$. The anode and cathode terminals of the tubes are disposed within this box-like structure, wholly imbedded in the composition, if desired, and having connection with the prongs C—C which project from the plastic body of the unit and thus provide in each instance a uniform, individual unit embodying a letter which can be interchangeably fitted on a suitable mounting to form a sign.

The prongs C—C are adapted to engage with the lamp mounting E, laterally adjustable in the interior of the cabinet, and positioned immediately beneath the top *a* and centered longitudinally with the opening B.

The lamp mounting E is formed by two parallel bars *e* and $e^1$ spaced apart and held together by a series of bars *f*. The bars *e* and $e^1$ are preferably composed of a non-conductive material, such as vulcanite or fibre.

Formed through the top bar *e* are a series of pin openings *g*, equally spaced apart, and fitted in the lower bar $e^1$ are a series of sockets *h*, held in position on the bar by fastening and lock nuts, *i* and *j* respectively. The lower ends of each alternate pair of sockets are connected together by a wire connection *k*, preferably spot welded to hold in place.

Depending from one end of the mounting E is a contact extension F having fitted in the lower end an anti-friction ball G, adapted to engage in contact with a plate H, electrified by a wire connection 2 extending to the source of energy fitted in the cabinet.

Formed down into the center of the contact extension F, is a bore $F^1$ in which may be inserted one of the prongs C, of the lamp D, the other prong engaging in the next adjacent socket *h*.

Depending from the opposite end of the mounting E, are two contact extensions I and $I^1$, having fitted in the lower ends anti-friction balls J and $J^1$, adapted to engage in contact with the plate K, electrified by a wire connection 3, extending and connected up with the source of energy connected with the cabinet.

The inner of the two contact extensions I, depending from the lower bar *e* is connected up with the adjacent socket *h*, by a wire connection $k^1$, spot welded with the lower end of the socket, but connected by a screw $k^2$ into the lower end of the extension I.

Formed down in the contact extension I and $I^1$ are bores M—$M^1$ into which the prongs C—C of the lamp D may be inserted to make an electrical contact.

When the lamp mounting E is in normal position within the cabinet the extensions F and I′ are in respective contact with the contact plates H and K. Consequently, since the lamps are then in series circuit they will be caused to light when the current is turned on. When the mounting E has been laterally shifted in the direction of the arrow, Fig. 4, the extension I′ disengages the plate K, while the extension I then comes into engagement with the plate K, thus the end letter of the sign is eliminated from electrical connection and may be removed, the circuit being completed from the plate K through the extension I, connection *k′* and socket *h* to complete the series connection throughout the remaining letters.

When the lamp mounting E is in normal position an even number of lamps may be inserted and set therewith, and when the mounting has been adjusted laterally an odd number of lamps may be inserted and set,. so that in either case, any word or phrase being spelled by the lamps, will be centered on the cabinet.

To provide for the lateral adjustment of the mounting E the top bar *e* of the mount engages in a channel bar $e^2$, fitted in longitudinal relation in the cabinet.

When the lamps are set in position on the cabinet to spell out the name or word, they are retained in position by a clamping frame O adapted to engage over the lamps and detachably connect with the cabinet.

The clamping frame O is also adapted for making and breaking the circuit with the lamp.

For the purpose of inserting or interchanging the lamps for changing the word or phrase spelled out by the lamps, it will be necessary to completely remove the clamping frame O from the casing. By detaching and removing the clamping frame from the cabinet for the purpose of making a readjustment or change of the lamps, the circuit connecting with the lamps will be opened, which provides a safeguard against electric shock. The clamping frame O also acts as a guard to prevent the lamps from being accidentally knocked out of place.

Depending from the underside of the ends of the clamping frame O are contact pins 10 and 11, and 12 designates a circuit connection coupling with the pins.

Fitted in the top of the cabinet at one end thereof are the sockets 13 which are designed to receive the pins 10 and 11 of the frame O. The sockets 13 are not electrically connected and are designed to break the continuity of the feed circuit wire 14 as shown in Fig. 2. Feed wire 14 as indicated, leads to the primary of the transformer 15, the feed circuit to the primary transformer being completed by the lead 16, the leads 14 and 16 connecting with a suitable source of power. This feed circuit is completed when the clamping frame is placed in position so that the pins 10 and 11 connected by the connecting wire 12 electrically connect sockets 13 so that current will then flow through the primary of the transformer 15. The secondary coil of the transformer is connected by the lead 2 with the plate H while a similar lead connects with the plate K generally indicated by the numeral 3 (Fig. 4). Consequently, a complete circuit is established only when the pins 10 and 11 of the frame O are introduced to the sockets 13 and this circuit is effected whether the mounting frame E is in normal position or has been shifted as previously described.

While I have only described the connnection and arrangement of one set of lamps mounted in detachable relation in the upper part of the cabinet, the second set of lamps shown on the lower front portion of the cabinet is similarly mounted, and coupled up in circuit in a similar manner to the set in the top of the cabinet, receiving the source of energy from the same supply.

Adapted to be detachably positioned over the second set of letters is a frame P fitted with contact pins 16 and wire connection, which is also adapted to make and break the circuit, by fitting in position or removing.

Various modification may be made in the arrangements of the parts and the wiring of the circuit without deviating from the nature of my invention.

What I claim as my invention is:

1. An interchangeable letter sign comprising a cabinet having an elongated opening formed through the top thereof, a lamp mounting fitted in said cabinet and positioned beneath said opening, a series of lamp sockets fitted in said mounting, a series of lamps formed in the shapes of letters comprising hermetically sealed tubes containing luminescent gas, adapted to be inserted and detachably engage in said sockets, a series of contacts depending from said mounting, contact plates set in said cabinet and engageable by said contacts, said mounting and contacts wired in circuit with an electrical source fitted in said cabinet, said lamp mounting adapted to be longitudinally adjusted to make and break the circuit connection with a portion of said lamp mounting and to center the display of lamps when varied on the said mounting numerically and permutably.

2. An interchangeable letter sign comprising a cabinet having an opening formed therein, a lamp mounting adapted to longitudinal adjustment fitted in said cabinet, said adjustment adapted for the purpose of centering said mounting in said cabinet when the lamps mounted thereon are varied numerically and permutably, a series of sockets wired in consecutive pairs fitted in said mounting, a series of lamps in the form of letters and comprising hermetically sealed tubes containing luminescent gas adapted to be inserted through said opening and detachably fitted in said sockets, said mounting being wired and connected up with a source of electric energy fitted in said cabinet, a guard adapted to engage over said letters and adapted to be detached for the purpose of adjusting and inserting said letters, said guard having an electric contact formed therewith for making and breaking circuit when being attached or detached from said cabinet.

JAMES R. STARNES.